Figure 1:
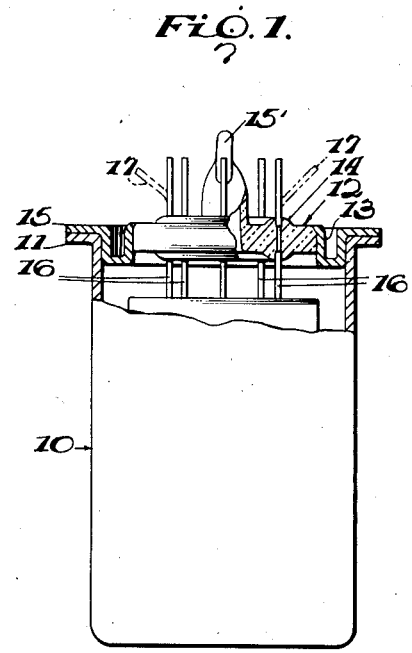

March 31, 1942.    E. R. MURPHY    2,278,392
METHOD OF CONNECTING LEAD WIRES AND TERMINALS
Filed Aug. 19, 1941    3 Sheets-Sheet 1

Inventor
Edward R. Murphy
By B. P. Fihlman
Attorney

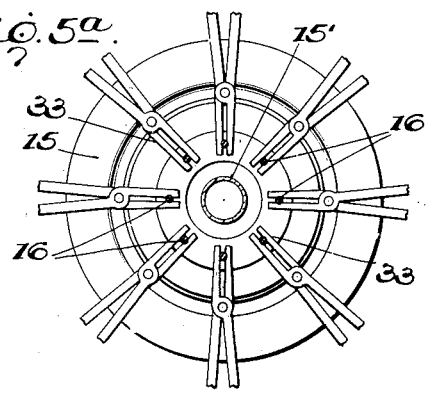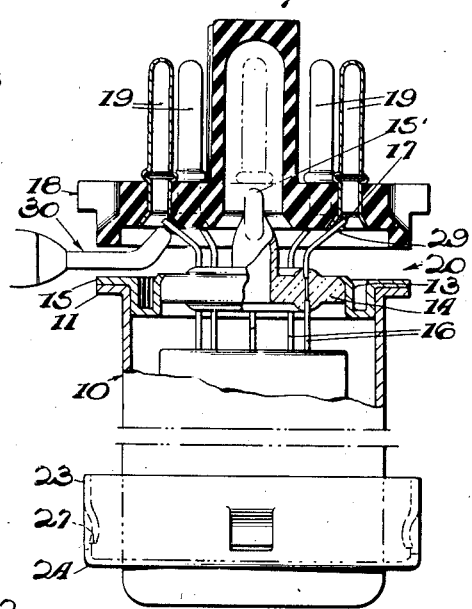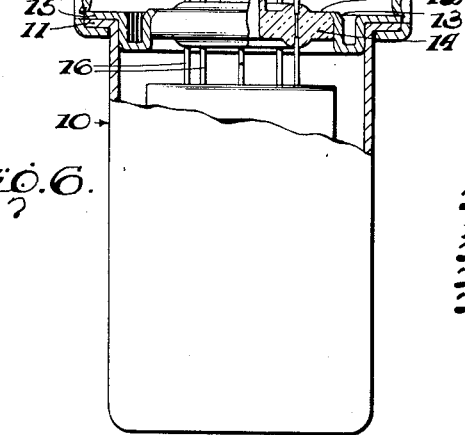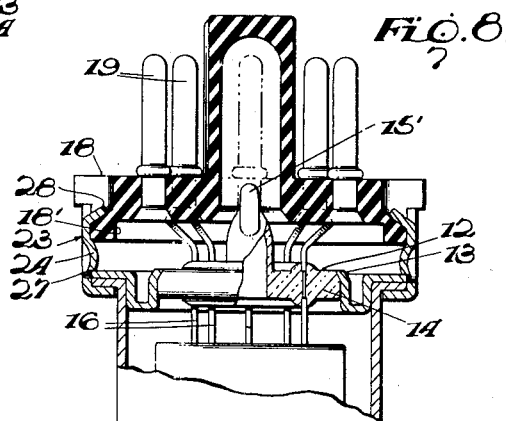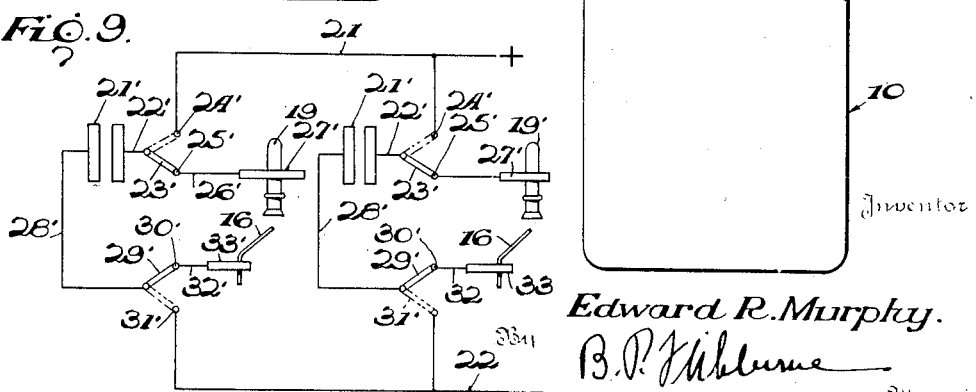

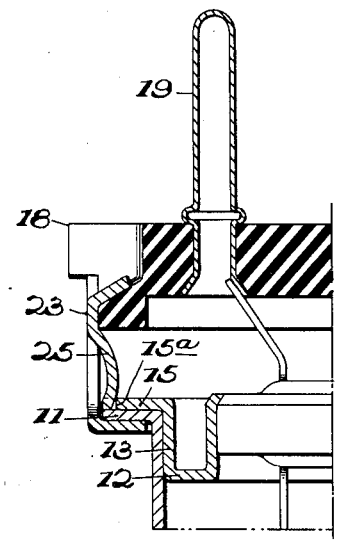
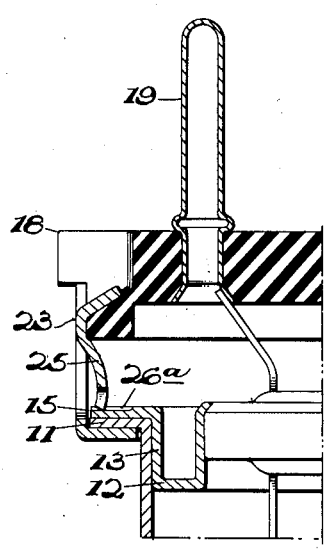
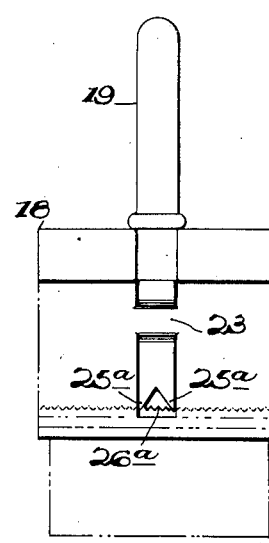
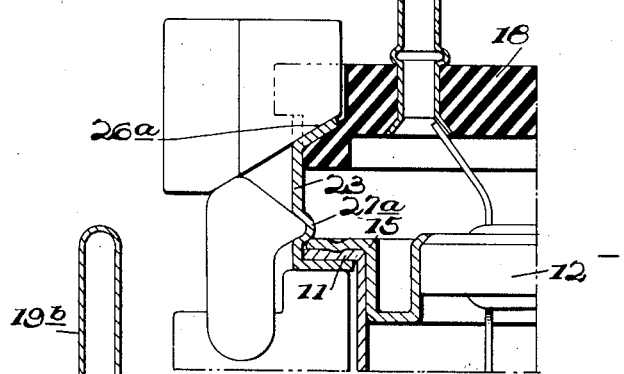
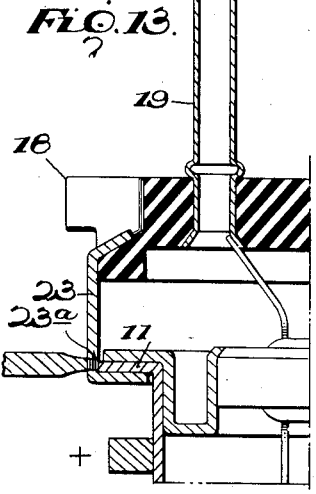
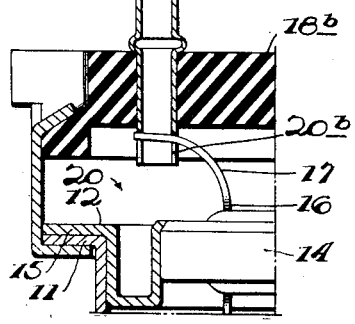

Patented Mar. 31, 1942

2,278,392

UNITED STATES PATENT OFFICE 2,278,392

METHOD OF CONNECTING LEAD WIRES AND TERMINALS

Edward R. Murphy, Elizabeth, N. J., assignor of one-half to Jack Slavitt, Newark, N. J.

Application August 19, 1941, Serial No. 407,501

21 Claims. (Cl. 250—27.5)

My invention relates to electrical translating devices such as electron tubes including radio tubes, gaseous discharge lamps, or the like, and has particular reference to a method of attaching the wires of such devices with their terminals.

In the present method of basing electron tubes such as radio tubes of the so-called metal tube type, a head having an insulating part which carries the lead wires is arranged adjacent to the open flanged end of the metal tube. An intermediate ring is interposed between the metal part of the head and the flange of the tube, and a skirt has a flange which engages beneath the flange of the tube. These assembled parts are permanently secured together to form a unit by welding the intermediate ring to the metal part of the head and by welding the superposed portions of the ring, flange, and skirt together. The lead wires carried by the insulating part of the head are relatively long and are threaded through the tubular terminals carried by an insulating base and the insulating base is placed upon the skirt and projects into the same, after which the base is attached to the skirt by staking. The assembled skirt and associated elements form an enclosed space which is inaccessible from the exterior. The ends of the lead wires passing through the tubular terminals extend to the exterior thereof and are then cut off substantially flush with the terminals and the entire device is inverted and the ends of the terminals dipped into molten solder whereby the lead wires are soldered to the tubular terminals. This method is time-consuming and expensive as it involves the straightening out of the lead wires and the threading of the same through the tubular terminals.

In accordance with my improved method, the head having the insulating part carrying the lead wires is applied to the flange of the main tube and these parts are permanently secured together by welding. The skirt is not secured in place upon the main tube at this time. The lead wires which are carried by the insulating part of the head are cut relatively short and preferably bent laterally and outwardly at their free ends. These lead wires are resilient. The insulating base is used and this base carries terminals which extend to or are accessible from the inner and outer faces of the base. The terminals are preferably tubular and their open ends are arranged upon the inner face of the insulating base. The base is now brought to a position near and spaced from the end of the main tube, whereby an open space is afforded between these parts so that access may be readily had to the lead wires. Since access may now be had to the lead wires and the inner ends of the terminals, the lead wires and terminals may be secured together by various manipulations. They might be mechanically connected by bending or clamping a part of one around or to the other. I propose to weld the lead wires to the terminals. I also propose to solder the lead wires to the terminals. After the lead wires are thus attached to the terminals the skirt is applied to the main tube and secured in place thereon. This skirt will now be arranged adjacent to the insulating base and will be attached thereto. The skirt securely fastens the base to the main tube and also covers the space which encloses the lead wires and associated elements.

Figure 4:
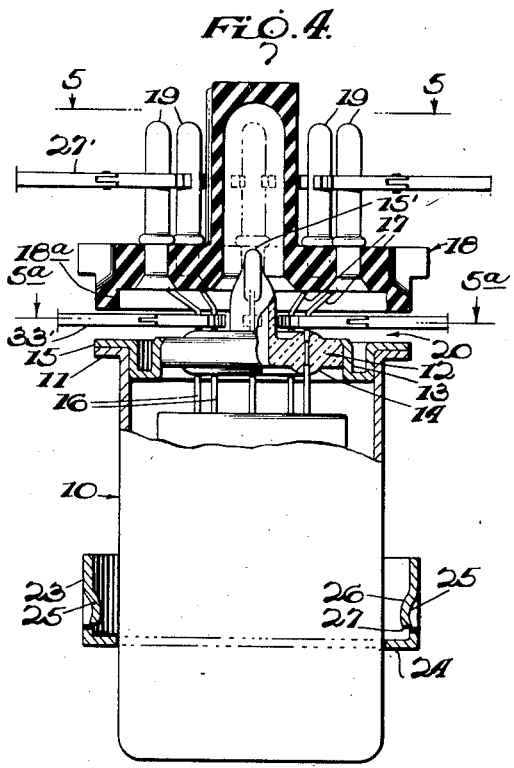
Figure 2:
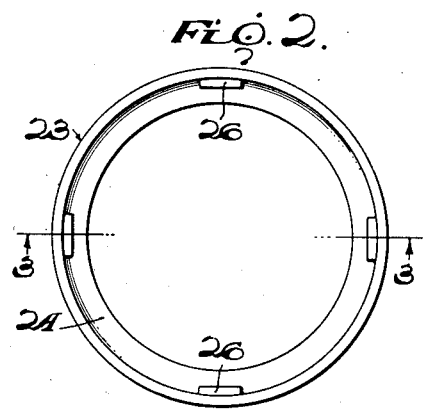
Figure 5:
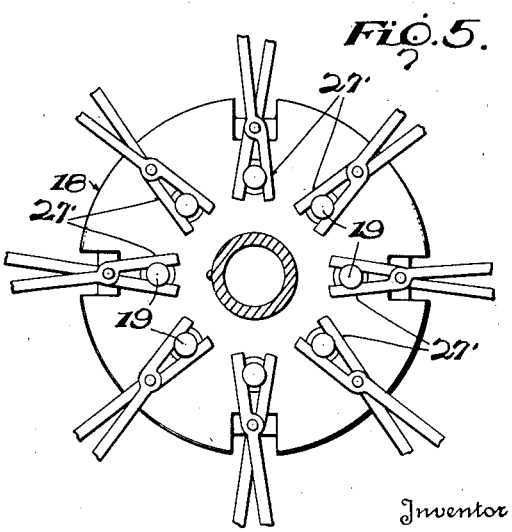
Figure 3:
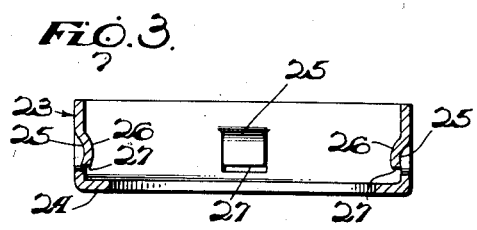

In the accompanying drawings forming a part of this application and in which like numerals are employed to designate like parts throughout the same, Figure 1 is a side elevation, parts in vertical section, showing a radio tube having the wires attached thereto in accordance with my method, Figure 2 is a plan view of the skirt removed, Figure 3 is a vertical section through the skirt removed, Figure 4 is a side elevation of the tube, parts in central vertical section, after the welding step, showing the terminal carrying base arranged near, above, and spaced from the tube and the lead wires contacting with the terminals, Figure 5 is a horizontal section taken on line 5—5 of Figure 4, Figure 5$^a$ is a similar view taken on line 5$^a$—5$^a$ of Figure 4, Figure 6 is a side elevation of the tube, parts in central vertical section, with the skirt in place and secured to the tube and the insulating base, Figure 7 is a side elevation of the tube, parts in central vertical section, showing the soldering of the lead wires to the terminals, Figure 8 is a similar view showing the soldering operation completed and the skirt shifted to the set position and attached to the tube and the insulating base, Figure 9 is a diagrammatic view of the clamping-terminals and welding circuit, Figure 10 is a detailed section, showing a slightly modified form of head, Figure 11 is a similar view showing a further modified form of head and modified locking tongue, Figure 12 is a side elevation of the locking tongue, Figure 13 is a detailed section through the skirt and associated elements, showing the welding of the skirt to the flange of the tube, Figure 14 is a detailed section through the skirt and associated elements, showing the staking of the skirt to the insulating base and to the flange of the tube, and, Figure 15 is a detailed section through a terminal carried by the insulating base, showing a mechanical connection between the terminal and lead wire, In the drawings, wherein for the purpose of illustration is shown a preferred embodiment of my invention, the numeral 10 designates the main tube of an electron tube, such as a radio tube. The main tube 10 contains the operating elements of the electron tube. The main tube 10 is closed at one end and its opposite end is formed open and is provided with an outwardly extending annular flange 11. The numeral 12 designates a head having an outer metal portion 13 and an inner insulating portion 14 formed of glass, provided with the usual tube 15' to evacuate the main tube 10. The tube 15' is closed by pinching. The metal portion 13 of the head has a flange 15, resting upon the flange 11, and secured thereto by welding. The flanges 11 and 15 are welded together prior to the evacuation of the main tube 10 and these parts constitute a unit. This is substantially the conventional construction. Embedded in the glass portion 14 are wires 16, which extend into the interior of the main tube 10 for connection with the operating parts of the electron tube. The wires 16 also extend to the exterior of the main tube 10. The wires 16 therefore extend beyond the outer and inner faces of the head 12. The wires 16 are formed in sections having different coefficients of expansion, as is well known. The wires 16 extend beyond the outer face of the head 12, as stated, but are relatively short. These wires are preferably originally cut relatively short before being embedded in the head 12, whereby the trimming of the outer ends of the wires is eliminated. This not only effects a saving in the wire, but the relatively short wires 16 readily remain vertical and are straight until bent and do not become displaced. By the use of relatively short wires I eliminate the step of separating and straightening out the long wires prior to threading such long wires through the tubular terminals, which threading step is also eliminated. While the wires 16 are relatively short they do extend a suitable distance beyond the flange 15.

I next bend the outer ends of the short wires 16 radially and outwardly forming angularly disposed ends 17 which when bent will occupy predetermined circumferential and radial position. This bending operation may be effected by any suitable means. All the wires may be bent at the same time by means of the tool 19 shown in my co-pending application 397,479, filed June 10, 1941, although the wires may be individually bent, if desired.

The numeral 18 designates an insulating base, formed of "Bakelite" or the like, and this base has tubular terminals 19 embedded therein and extending to the inner and outer faces of the base. The tubular terminals 19 may have their outer ends closed while their inner ends are formed open. It is preferred to use tubular terminals, but the invention is not restricted to this feature as satisfactory results can be obtained by using solid terminals. The terminals correspond in number and radial and circumferential arrangement to the bent ends 17 of the wires.

The base 18 is arranged above the main tube 10 and is now brought downwardly over the flange 15, and the bent ends 17 of the lead wires will engage the inner ends of the terminals 19, at which time the welding step is effected, as will be explained. The base 18 and the flange 15 may have suitable markings so that the terminals 19 will align with the bent ends 17 of the lead wires. When the base 18 is brought downwardly toward the flange 15 it is supported in a position spaced from the flange 15 whereby a circumferentially extending open space 20 is provided. The main tube 10 is supported in a vertical position and the insulating base is also supported in the position near and spaced from the flange 15 before and after the welding step.

In Figure 9, I have shown diagrammatically the welding circuit. In Figure 9, the numeral 21 designates a positive wire and 22 a negative wire of a welding circuit. A separate condenser is employed to weld each terminal to its lead wire so that the welding is effected by the discharge of the condenser. The condensers are designated by the numeral 21'. One side of each condenser is connected with a wire 22' connected with a switch 23', adapted to alternately engage stationary contacts 24' and 25'. The stationary contact 24' is connected with the wire 21 and the stationary contact 25' is connected with a wire 26' connected with a terminal-clamp 27' to be mounted upon the terminal 19. A wire 28' is connected with the opposite side of the condenser 21' and this wire is connected with a switch 29' to alternately engage stationary contacts 30' and 31'. The stationary contact 30' is connected with a wire 32' connected with a lead wire clamp 33' to be mounted upon the lead wire 16. The stationary contact 31' is connected with the wire 22.

While I have only shown two condensers and associated elements, it is obvious that where there are eight terminals and eight lead wires there will be eight condensers and associated elements.

To charge each condenser the switch 23' is thrown into engagement with the contact 24' and the switch 29' into engagement with the contact 31'. After the condenser is charged, switch 23' will be brought into engagement with the contact 25' and switch 29' into engagement with the contact 30'. The terminal 19 is therefore connected with one side of the condenser while the lead wire 16 is connected with the other side of the condenser. The switches 23' and 29' of all of the condenser units engage the contacts 25' and 30' just prior to the welding operation. When the insulating base 18 is brought to a position near and spaced from the head 12, the terminals 19 are spaced from the lead wires 16. After this, the insulating base 18 is moved down further to bring the terminals 19 into contact with the lead wires 16. At the instant of contact the condensers discharge and the contacting terminals and lead wires are welded together at the points of contact. The several terminals and lead wires are preferably simultaneously welded. Figure 4 of the drawings shows the insulating base 18 moved downwardly so that the terminals 19 contact with the lead wires 16 and when the parts assume the position shown in Figure 4, the welding has been effected. If desired, each terminal 19 could be separately welded to its corresponding lead wire. The terminal-clamps and lead wire clamps are now removed from the terminals and lead wires. The open passage 20 renders it possible to effect this welding operation.

The next step in the method is to mount and attach the insulating base 18 upon the main tube 10.

Attention now being called to Figures 2 and 3, it will be seen that the numeral 23 designates a metal skirt, which is cylindrical and is provided at its lower end with a horizontal inwardly extending flange 24. The metal skirt 23 is provided with resilient locking tongues 25 stamped therefrom and arranged within the skirt 23. Each locking tongue has an upper inclined face 26 and a lower abrupt shoulder or jaw 27.

This skirt 23 is applied to the main tube 10 by inserting the same upon the lower closed end of the main tube and is then moved upwardly along the main tube until the flanges 11 and 15 are reached. These flanges engage the inclined faces 26 and force the resilient locking tongues 25 outwardly and when the locking tongues pass above the upper flange 15 they spring inwardly over the flange 15 and are then disposed to engage the upper face of this flange 15. The flange 24 and the locking tongues 25 now lock the skirt to the superposed flanges 11 and 15 so that these are permanently connected. When the skirt 23 was shifted to the uppermost position, as explained, the lower portion 18a of the base 18 entered the upper end of this skirt, and the skirt 23 and the base 18 are now permanently connected by staking, as shown at 28. If desired, the skirt 23 may be welded to the flange 11, as shown at 23a. This welding may occur at any suitable number of points around the skirt 23 and is preferably spot welded. This welding is indicated in Figure 13.

In Figure 10, I have shown a slight modification of the head 12. In this figure the flange 15 of the metal portion 13 is provided at its periphery with notches 15a, corresponding in number and arrangement to the locking tongues 25, and these tongues spring into the notches 15a and engage the flange 11. The tongues 25 are elongated, for this purpose.

In Figures 11 and 12, the tongues 25 are shortened and are of the same length as shown in Figures 6 and 8, so that they will spring inwardly over the flange 15 of the metal portion 13 of the head 12. The free or lower end of the tongue 25 is forked forming tapered teeth 25a, to engage with serrations 26a, formed upon the upper surface of the flange 11. The constructions of Figures 10 to 12 inclusive, prevent the turning movement of the skirt 23 upon the tube 10.

In Figure 14, I have shown the skirt 23 assembled upon the insulating base 18 and head 12. The locking tongues 25 are omitted from the skirt 23. The skirt 23 is staked at 26a to the insulating base 18, at spaced points, such as at four points, and the skirt 23 is also staked at 27a to the assembled flanges 15 and 11, at correspondingly spaced points. Of course, the skirt 23 is placed in position after the welding operation.

In Figures 7 and 8, I have shown a modification of the invention wherein the lead wires and terminals are secured together by soldering. The terminals 19 are preferably tubular, as stated, and their inner ends are open and solder 29 is applied to the inner ends of the tubular terminals 19 after they are embedded in the base 18. In applying the solder to each tubular terminal 18, a drop of molten solder is applied to the open end of the terminal, and this drop of solder is allowed to cool to produce a solid solder mass, before the solder mass is brought down into engagement with the bent end 17 of the lead wire. Since the terminals are tubular the molten solder will enter the inner ends of the same and this aids in securing the solder to the terminals.

The base 18 is now brought down to a position near and spaced above the main tube 10 and the solid solder masses engage the bent ends 17 of the lead wires 16 and these lead wires are placed under compression. Heated soldering tools 30 are now inserted through the open space 20 to contact with the bent ends 17 and the solder is heated by the conduction of heat through the bent ends 17, or by direct contact with the soldering tool, or both. When the solder melts the lead wire 16 being under compression tends to straighten out and hence becomes embedded in the molten solder mass. This effects a secure joint between the lead wire and the terminal. The solder masses may be heated simultaneously or individually. After the lead wires have been soldered to the inner ends of the terminal the soldering tool or tools are, of course, removed and the skirt 23 is now moved upwardly to close or cover the passage 20 and to mount and attach the base 18 upon and to the main tube 10, by any of the methods as explained.

I also contemplate using a solder mass which is plastic while cold. This plastic solder mass never hardens until melted by heat. The cold plastic solder mass is introduced into the inner open ends of the tubular terminals, and remains plastic when brought into engagement with the bent ends 17 of the lead wires 16, as explained in connection with the solid solder masses. The bent ends 17 readily sink into the cold plastic solder mass and contact with the terminals 19, and this engagement with the terminals places the bent lead wires under compression. The cold plastic solder mass may consist of finely ground solder particles mixed with a commercial soldering flux such as "No Korode." This flux is a sticky acid paste which keeps the parts to be soldered cleaned. After the bent wires have become embedded in the cold plastic solder mass the heated soldering elements are brought into contact with the bent ends 17 of the lead wires, as explained, and the heat will be transmitted to the plastic solder mass by the conduction of heat through the bent ends 17 or by direct contact with the soldering element or both, whereby the solder particles are melted, and upon the removal of the soldering tool the solder mass will harden and become solid and thereby securely attach the wires to the terminals. The skirt 23 is subsequently placed and secured in position, as explained.

The practice of the several methods are identical except that in the one method the contacting elements are secured together by welding, while in the other method the contacting elements are secured together by soldering and in the soldering method either a cold solid solder mass may be used or a cold plastic solder mass.

I also contemplate securing the lead wires to the terminals by a mechanical connection other than welding or soldering. This is illustrated in Figure 15. To accomplish this, the terminals 19b are used, corresponding in number and arrangement to the terminals 19 and an insulating base 18b is used, corresponding to the base 18.

The terminals 19ᵇ are embedded in the base 18ᵇ and extend downwardly below the same and have their inner ends slotted, as shown at 20ᵇ. As each terminal 19ᵇ moves downwardly, the lead wire 16 enters the slotted end of the terminal. These interfitting parts may be secured together by inserting pliers or the like through the open space 20 and squeezing or clamping the slotted end of the terminal about the lead wire. After the lead wires are thus attached to the terminals the skirt 23 is placed in position, and secured to the insulating base and the tube 10, by any of the means described.

In the practice of the method, it is preferred to arrange and support the main tube vertically, and the relatively short lead wires 16 will be vertical, before bending. It is preferred to arrange the base 18 horizontally with their inner ends next to the lead wires 16 and to move the base from the horizontal position over the main tube 10 downwardly in a vertical line to bring the inner ends of the terminals 19, or the solder masses carried thereby into engagement with the bent ends of the lead wires. However, the invention is in no sense restricted to the vertical arrangement of parts and to the vertical movements of elements as the same may be changed to horizontal positions or angular positions.

It is not intended to limit the invention by the explanation of the same in the introductory portion of the specification, which is given solely for the purpose of explaining the invention, in the beginning.

While I have shown and described my method as applied to the production of an electron tube, such as a radio tube, yet the invention is not restricted to this application as I contemplate using the same in producing other translating electrical devices having a plurality of wires to be connected with a plurality of terminals, such as gaseous discharge lamps including fluorescent lamps and the like.

It is to be understood that the forms of my invention herewith shown and described are to be taken as preferred examples of the same and that various changes in the shape, size, and arrangement of parts may be resorted to and that changes may be made in the order of the steps of the method without departing from the spirit of the invention or the scope of the subjoined claims.

Having thus described my invention, what I claim is:

1. The method of basing an electrical translating device having a casing and lead wires extending into the casing and having outer ends which are accessible from the exterior of the casing, said method comprising the steps of arranging the lead wires substantially vertical, bending the outer ends of the lead wires laterally, moving an insulating base and terminals carried thereby which terminals extend to the inner and outer faces of the base toward the lead wires to bring the lead wires and the inner ends of the terminals into close relation and retaining the base spaced from the casing to provide an open space to afford access to the lead wires, manipulating through the open space for attaching the lead wires to the inner ends of the terminals, and then mounting the base upon the main tube and attaching the base to the main tube and substantially covering the space so that access cannot be had through the space to the lead wires.

2. The method of basing an electrical translating device having a casing and lead wires having outer ends which are accessible from the exterior of the casing, said method comprising the steps of supporting the casing in a selected position, moving an insulating base and terminals carried thereby which terminals extend to the inner and outer faces of the base toward the lead wires to bring the lead wires and the inner ends of the terminals in close relation while retaining the base spaced from the casing to provide an open space to afford access to the lead wires, manipulating through the open space for attaching the lead wires to the inner ends of the terminals, and then covering the open space and mounting the insulating base upon the casing.

3. The method of basing an electrical translating device having a casing and lead wires having outer ends which are accessible from the exterior of the casing, said method comprising the steps of supporting the casing in a selected position, moving an insulating base and terminals carried thereby which terminals extend to the inner and outer faces of the base toward the lead wires to bring the lead wires and the inner ends of the terminals in close relation while retaining the base spaced from the casing to provide an open space to afford access to the lead wires, manipulating through the open space for attaching the lead wires to the inner ends of the terminals, attaching the insulating base with the casing while maintaining them in spaced relation and covering the open space.

4. The method of basing an electrical translating device having a casing and lead wires having outer ends which are accessible from the exterior of the casing, said method comprising the steps of effecting a relative movement between the casing and an insulating base and terminals carried thereby which terminals extend to the inner and outer faces of the base to bring the lead wires and the inner ends of the terminals in close relation while retaining the base spaced from the casing to provide an open space to afford access to the lead wires, manipulating through the open space for attaching the lead wires to the inner ends of the terminals, and then covering the open space and attaching the base to the casing.

5. The method of basing an electrical translating device having a casing and lead wires having outer ends which are accessible from the exterior of the casing, said method comprising the steps of effecting a relative movement between the casing and an insulating base and terminals carried thereby which terminals extend to the inner and outer faces of the base to bring the base to a position near and spaced from the casing for affording an open space and the inner ends of the terminals in close relation to the lead wires, manipulating through the open space for attaching the lead wires to the inner ends of the terminals, and moving a skirt across the open space to cover the same and connecting the base with the casing through the medium of the skirt.

6. The method of basing an electrical translating device having a casing and lead wires having outer ends which are accessible from the exterior of the casing, said method comprising the steps of effecting a relative movement between the casing and an insulating base and terminals carried thereby which terminals extend to the inner and outer faces of the base to bring the base to a position near and spaced from the casing for affording an open space and to bring the inner ends of the terminals in close relation to the lead wires, manipulating through the open space for attaching the lead wires to the inner ends of the terminals by the fusion of metal, enclosing the open space by a skirt, and causing the skirt to engage the casing and insulating base.

7. The method of basing an electrical translating device having a casing and lead wires having outer ends which are accessible from the exterior of the casing, said method comprising the steps of effecting a relative movement between the casing and an insulating base and terminals carried thereby which terminals extend to the inner and outer faces of the base to bring the base to a position near and spaced from the casing for affording an open space and to bring the inner ends of the terminals into contact with the lead wires, manipulating through the open space to weld the lead wires to the inner ends of the terminals, enclosing the open space by a skirt, and attaching the skirt to the casing and the insulating base.

8. The method of basing an electrical translating device having a casing and lead wires having outer ends which are accessible from the exterior of the casing, said method comprising the steps of effecting relative movement between the casing and an insulating base and terminals carried thereby which terminals extend to the inner and outer faces of the base to bring the base to a position near and spaced from the casing for affording an open space and to bring the inner ends of the terminals in contact with the lead wires, connecting the lead wires through the open space with a welding circuit and connecting the welding circuit with the terminals upon the outer side of the base, and operating the welding circuit to weld the lead wires to the inner ends of the terminals.

9. The method of basing an electrical translating device having a casing and lead wires having outer ends which are accessible from the exterior of the casing, said method comprising the steps of effecting a relative movement between the casing and an insulating base and terminals carried thereby which terminals extend to the inner and outer faces of the base to bring the base to a position near and spaced from the casing for affording an open space and to bring the inner ends of the terminals in close relation with the lead wires, manipulating through the open space to solder the lead wires to the inner ends of the terminals, and covering the open space and attaching the insulating base to the casing.

10. The method of basing an electrical translating device having a casing and lead wires which are accessible from the exterior of the casing, said method comprising the steps of effecting a relative movement between the casing and an insulating base and terminals carried thereby which terminals extend to the inner and outer faces of the base and have solder applied to their inner ends, to bring the base to a position near and spaced from the casing for affording an open space and to bring the ends of the lead wires into engagement with the solder carried by the inner ends of the terminals, passing a heated soldering tool into the space for melting the solder carried by each terminal and thereby attaching the corresponding lead wire to the terminal, withdrawing the soldering tool from the space, enclosing the space by a skirt, and attaching the skirt to the casing and insulating base.

11. The method of basing an electrical translating device having a casing and lead wires having outer ends which are accessible from the exterior of the casing, said method comprising the steps of effecting a relative movement between the casing and an insulating base and terminals carried thereby which terminals extend to the inner and outer faces of the base to bring the lead wires and the inner ends of the terminals in close relation while retaining the base spaced from the casing to provide an open space to afford access to the lead wires, manipulating through the open space to clamp the lead wires to the inner ends of the terminals, and then covering the open space and attaching the base to the casing.

12. The method of basing an electrical translating device having a casing and lead wires having outer ends which are accessible from the exterior of the casing, said method comprising the steps of effecting a relative movement between the casing and an insulating base and terminals carried thereby which terminals extend to the inner and outer faces of the base to bring the base to a position near and spaced from the casing for affording an open space and the inner ends of the terminals in close relation to the lead wires, manipulating through the open space for attaching the lead wires to the inner ends of the terminals, moving a skirt across the open space to cover the same, attaching the skirt to the casing so that the skirt cannot turn with relation to the casing, and attaching the base to the skirt so that the base cannot turn with relation to the skirt.

13. An electron tube comprising a casing provided near one end with an outwardly extending flange, lead wires for the tube, an insulating base arranged near and spaced from the flange, terminals carried by the insulating base and having electrical connection with the lead wires, a skirt mounted upon the casing to cover the space between the base and casing and having means to engage the flange resilient devices other than said flange engaging means and carried by the skirt for locking engagement with the flange, and means to attach the base to the skirt.

14. An electron tube comprising a casing provided near one end with an outwardly extending flange, lead wires for the tube arranged near the flange, an insulating base arranged near and spaced from the flange to provide a space, terminals carried by the insulating base and having electrical contact with the lead wires, a skirt mounted upon the casing and having an inwardly projecting portion to engage with one face of the flange, resilient means carried by the skirt for engaging with the opposite face of the flange, and means for securing the base to the skirt.

15. An electron tube comprising a casing provided near one end with an outwardly extending flange having serrations upon its outer face, lead wires for the tube arranged near the flange, an insulating base arranged near and spaced from the flange to provide an open space, terminals carried by the insulating base and having electrical connection with the lead wires, a skirt mounted upon the casing and having an inwardly projecting portion to engage the inner face of the flange, resilient tongues carried by the skirt and moving inwardly to engage the serrated face of the flange, the insulating base being secured to the skirt.

16. An electron tube comprising a casing provided near one end with an outwardly extending flange having notches, lead wires for the tube arranged near the flange, an insulating base arranged near and spaced from the flange to provide an open space, terminals carried by the insulating base and having electrical connection with the lead wires, a skirt mounted upon the flange and having an inwardly projecting portion to engage the inner face of the flange, resilient tongues carried by the skirt and moving inwardly and having parts to enter the notches, the skirt engaging the insulating base.

17. An electron tube comprising a casing having one end open, lead wires for the tube which are accessible through the open end, a head mounted within the casing adjacent to its open end and having an insulating part carrying the lead wires, an insulating base arranged near and spaced from the open end of the casing to provide an open space, terminals carried by the insulating base and having inner ends extending to the inner side of the base, the lead wires terminating adjacent to the inner ends of the terminals and attached to such inner ends, a skirt mounted upon the casing and shifted to a position to cover the open space after the lead wires are attached to the terminals, the skirt serving to hold the insulating base in place, the skirt being welded to the casing.

18. An electron tube comprising a casing having one end open, lead wires for the tube which are accessible through the open end, a head mounted within the casing adjacent to its open end and having an insulating part carrying the lead wires, an insulating base arranged near and spaced from the open end of the tube to provide an open space, terminals carried by the insulating base and having inner ends extending to the inner side of the base, the lead wires terminating adjacent to the inner ends of the terminals and attached to such inner ends, a skirt mounted upon the casing and shifted to a position to cover the open space after the lead wires are attached to the terminals, the skirt serving to hold the insulating base in place, the skirt having means for securely attaching the same to the casing.

19. An electron tube comprising a casing provided near one end with an opening, lead wires for the tube which are accessible through the opening, a head mounted within the casing adjacent to its opening and having an insulating part carrying the lead wires, an insulating base arranged near and spaced from the open end of the casing forming an open space therewith, terminals carried by the insulating base and having inner ends, the lead wires terminating adjacent to the inner ends of the terminals and having electrical connection with such inner ends, and a skirt to cover the open space and secured to the casing and the insulating base.

20. An electron tube comprising a casing, a head mounted within the casing and having an insulating part, lead wires carried by the insulating part, an insulating base mounted upon the casing, terminals carried by the insulating base and having inner ends, the lead wires having their ends terminating adjacent to the inner end of the terminals and secured to such inner ends, the lead wires and inner ends of the terminals being enclosed by a portion of the casing.

21. An electron tube comprising a casing having an open end, a head mounted within the casing adjacent to such open end and having an insulating part, lead wires carried by the insulating part and extending to the exterior of the casing, an insulating base having its marginal edge permanently spaced from the open end of the casing, terminals mounted upon the insulating base and extending to the inner face of the insulating base, the free ends of the lead wires terminating at the inner ends of the terminals and electrically contacting therewith, and means formed separate from the casing and attaching the insulating base to the casing while maintaining the same spaced from the casing.

EDWARD R. MURPHY.